March 4, 1952  M. A. ROWE  2,587,769
BALE STACKING AND UNSTACKING MACHINE
Filed April 5, 1948  3 Sheets-Sheet 2

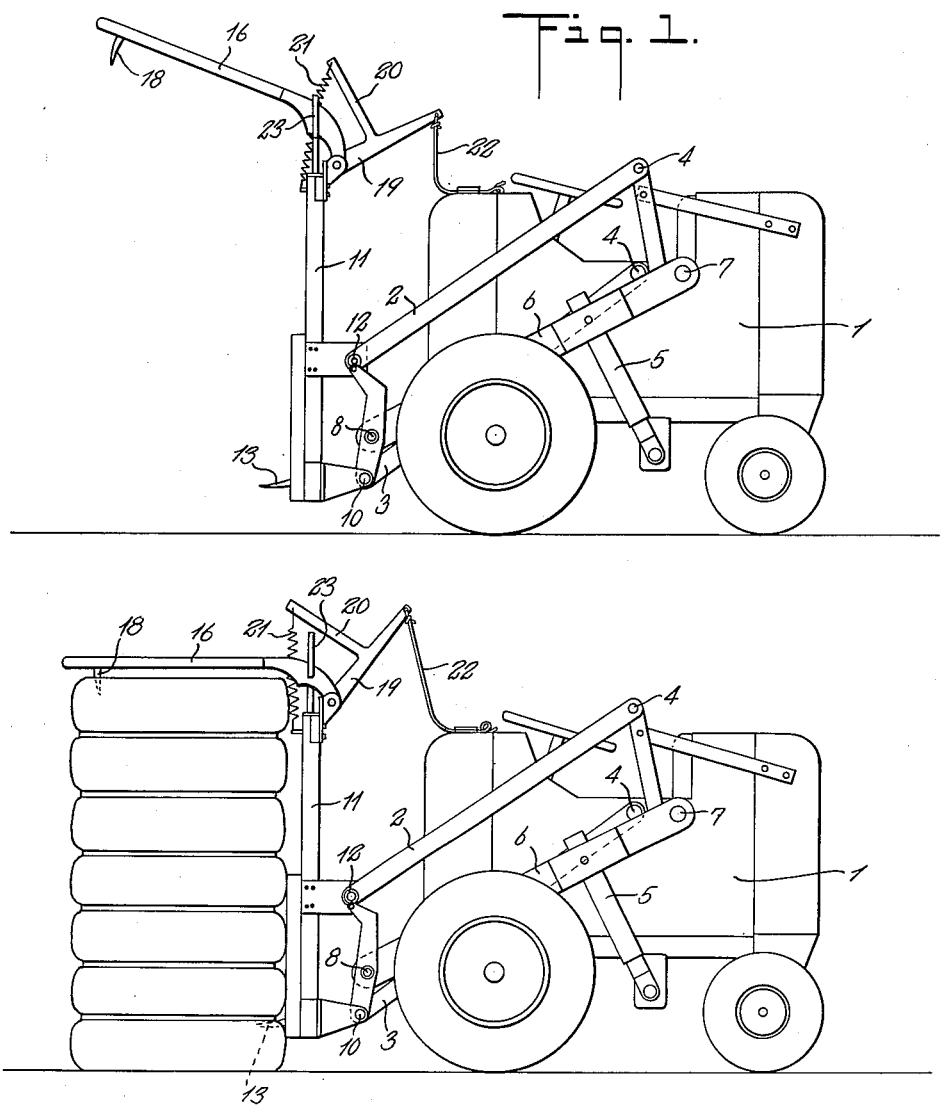

INVENTOR.
Malcolm A. Rowe
BY Kenyon & Kenyon
ATTORNEYS

March 4, 1952 M. A. ROWE 2,587,769
BALE STACKING AND UNSTACKING MACHINE
Filed April 5, 1948 3 Sheets-Sheet 3

INVENTOR.
Malcolm A. Rowe
BY
Kenyon & Kenyon
ATTORNEYS

Patented Mar. 4, 1952

2,587,769

UNITED STATES PATENT OFFICE 2,587,769

BALE STACKING AND UNSTACKING MACHINE

Malcolm A. Rowe, Comer, Ga., assignor to Rowe Warehouse & Fertilizer Company, Athens, Ga., a partnership Application April 5, 1948, Serial No. 18,954

5 Claims. (Cl. 214—66)

This invention is a stacking and unstacking machine for use with blades of penetrable material, as exemplified by bulk cotton bales. It does not require the use of bale pallets, and it overcomes the inability of prior art, non-pallet machines to stack and unstack bales laterally between other bales too close together to permit the use of bale-engaging side arms and the like.

A specific example of a bale stacking and unstacking machine, embodying all of the principles of the invention in what is at present considered their best form, is illustrated by the accompanying drawings, in which:

Fig. 1 is a side view of the machine prior to engaging a bale;

Fig. 2 is similar to Fig. 1 but shows a bale engaged by the machine;

Figure 3:
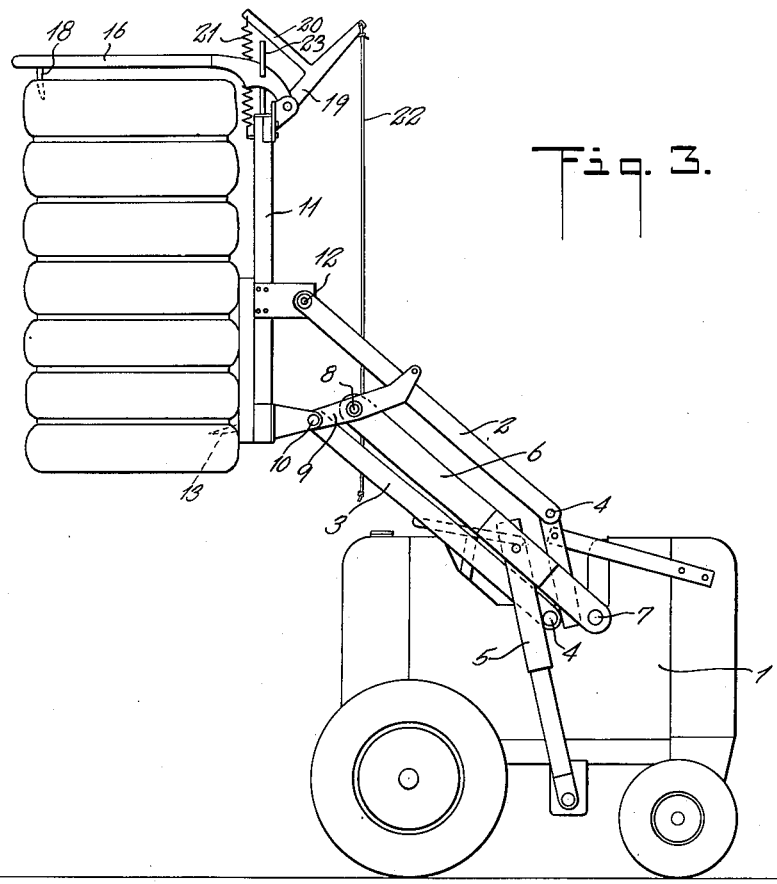
Fig. 3 is also similar to Fig. 1 but shows the bale engaged and lifted for stacking at an elevated position.
Figure 4:
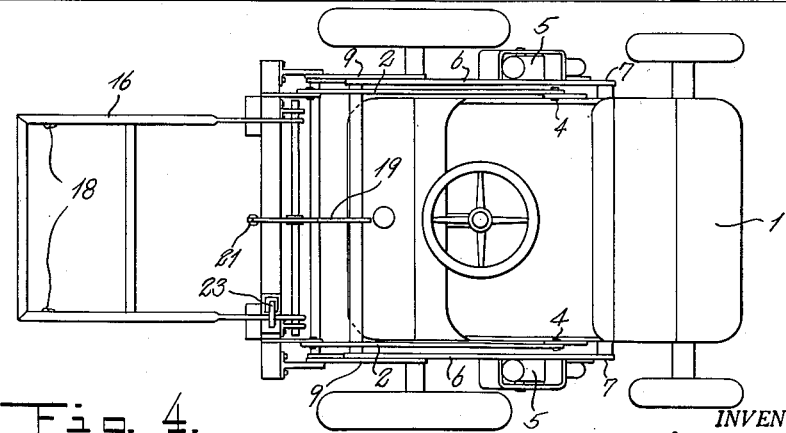
Fig. 4 is a top view of the machine.
Figure 5:
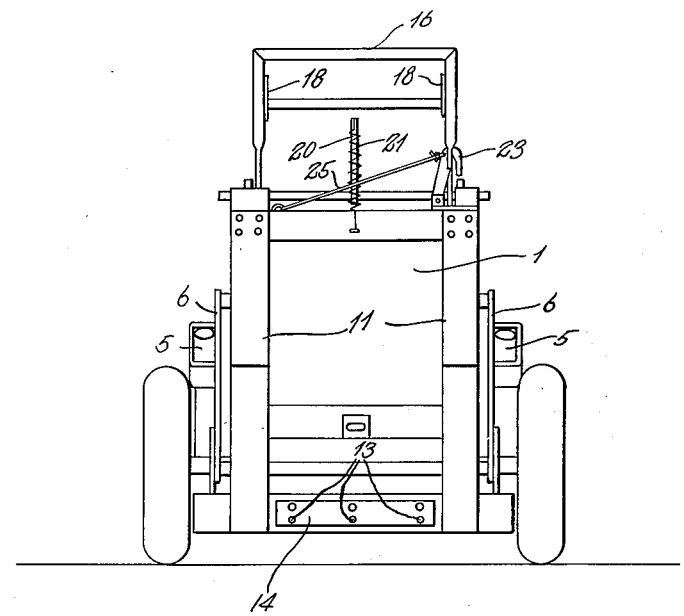
Fig. 5 is a front end view of the machine.
Figure 6:
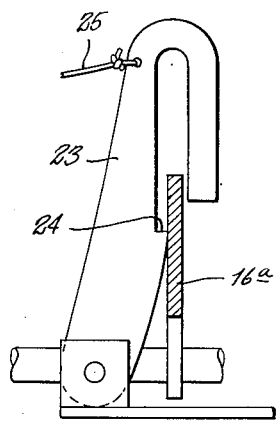
Figs. 6 and 7 are enlargements of details of a latch used by the machine with Fig. 6 showing it unlatched and Fig. 7 showing it latched.
Figure 7:
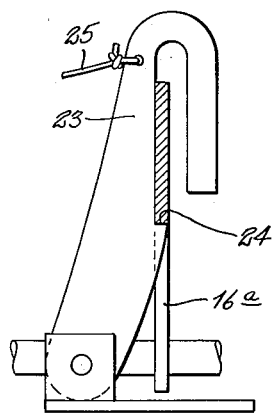

The machine illustrated by these drawings is particularly designed to stack and unstack cotton bales. It includes a power truck 1 of the type adapted to carry the operator with the latter steering and controlling the truck. This unit may be in the form of any of the small industrial trucks used for the same general purpose.

A parallel lever system is formed by laterally spaced upper levers 2 and laterally spaced lower levers 3, with the sets of upper and lower levers vertically spaced and in parallel relation. The levers' rear ends are pivoted to the truck 1, by pivots 4, and the system may be swung up and down by hydraulic motors 5 which swing levers 6 having their rear ends mounted through pivots 7 by the truck, and their forward ends connected by pivots 8 to transverse levers 9 which are connected to the forward ends of the lower levers 3 by pivots 10. This lever system projects forwardly from the truck 1.

A vertical abutment, in the form of laterally spaced, vertical posts 11, is pivotally carried by the forward ends of the levers 2 and 3. The pivots 10 connect this abutment with the lower levers 3, and pivots 12 connect the abutment with the upper levers 2. The arrangement is such that when the hydraulic motors 5 are operated, to swing the levers 6 upwardly, the latter carry the parallel lever system upwardly with the abutment 11 continuously maintained in a vertical plane. The parallel lever system keeps the vertical abutment in its proper vertical position regardless of its elevation.

Spikes 13 project forwardly from the lower portions of the abutment 11. The posts, comprising this abutment, are fixed in their mutually parallel, laterally spaced relation by a lower cross bar 14 and an upper cross bar 15. The spikes 13 project forwardly from the lower abutment bar 14, and are arranged, at a slight but appreciable upward angle, in horizontal alignment in a group that is at least slightly narrower, horizontally, than the widths of the bales to be handled. The spikes 13 should be sharp enough to penetrate the bales of cotton, or other penetrable material, when the truck operator operates the truck to push the vertical abutment 11 against the bale. An upward spike angle of about 10° from horizontal is suggested, though not considered critical. The operator should cause all the spikes to penetrate the bale so that none are extending laterally free beyond the bale.

A lever frame 16 is connected by pivots 17 to the top of the abutment 11 to swing downwardly to the top of the bale penetrated by the forwardly and upwardly projecting spikes 13. Laterally spaced spikes 18 project downwardly from this lever frame to penetrate the top of the bale, and means, presently described, are provided for swinging and holding the lever frame downwardly. The lever frame 16 should be no wider than the bales to be stacked, and the laterally spaced, downwardly projecting spikes 18 are arranged in a group which is also no wider.

In operation, the machine operator, sitting on the truck or tractor, raises or lowers the abutment 11, by operation of the motor 5, so the abutment registers with the bale to be handled. It is assumed that the bales are vertical, as is usual. Then he runs the tractor forwardly and sticks the spikes 13 into the bale near its bottom, after which he operates the lever frame 16 downwardly so the spikes 18 stick into the top of the bale and provide a steadying means preventing the bale from swinging relative the spikes 13. Then, by operation of the motors 5 in conjunction with forward or reverse movement of the truck on which he is riding, the operator may manipulate the bales as he desires. The bale remains vertical at all times.

Since all the spikes are laterally spaced widths less than the width of the bale, the operator may jam the bale tightly between two other vertical bales, or remove a bale jammed between these two laterally spaced bales, regardless of how closely the bales fit laterally together. There are no side arms to get in the way. Since the lever frame 16 is also narrower than the bale, he may place the latter between other bales regardless of the others being parts of piles extending higher than the bale being handled. By making the lower cross bar 14, of the abutment, somewhat wider than the bale, it acts as a limiting means preventing the operator from pushing a bale beyond flush alignment with other bales beside it, since the cross bar engages the other adjacent bales. If this effect is not desired, the entire abutment may be made narrower than the bales being handled. It is to be understood that bales of any given penetrable commodity, are normally of substantially the same dimensions.

The means for manipulating the lever frame 16 comprises a vertically swinging operating lever 19 projecting rearwardly from the lever frame 16 and connected therewith to swing the latter. This lever 19 has an upstanding arm 20 to the upper end of which is connected a coil tension spring 21, the lower end of this spring being connected to the upper portion of the abutment 11. Therefore, the lever frame 16 is continuously biased downwardly by the spring 21. The arm 20 extends upwardly from the lever 19 near the latter's center, and the further projecting arm length of this lever 19 is provided with a rope 22 long enough to reach to the operator working the truck. By pulling on this rope 22 the operator can swing the lever frame 16 upwardly, and if he then lets go the lever frame will swing downwardly. Thus the spikes 18 will be swung downwardly into engagement with a bale penetrated by the lower spikes 13. This steadies the bale by keeping it from swinging laterally about the spikes 13. The spring bias maintains the engagement of the spikes 18 with the bale's top.

When the rope 22 is pulled to pull down on the upper end of the lever 19 and thus swing the lever frame 16 upwardly to its inoperative position, a rear end portion 16a, of the lever frame 16, rides up past a laterally swinging latch 23 having a latch surface 24. When the bottom end of the frame 16a clears this latch surface 24, the latch 23 laterally swings, through its weight, so its latch surface 24 engages beneath the portion 16a. Thus the frame 16 may be latched, or cocked, in its up position. A rope or cord 25 is fixed to the swinging upper end of the latch 23 and is made long enough for the operator to pull on it from his truck seat. Also, it may be necessary to loop the rope or cord 23 around a part of the machine to get its pull directed in the right direction for releasing the latch 23.

It follows from the foregoing that the machine operator can effect engagement of the top of a bale simply by pulling on the rope or cord 25. This unlatches the latch 23 and permits the lever frame 16 to swing downwardly and drive its spike arrangement into the top of the bale. The bale may be released by pulling on the rope 22 to swing the frame back up again, the frame automatically relatching when swung up high enough. Both of the ropes or cords 22 and 25 should be long enough for the machine operator to reach them handily even when the abutment 11 is swung to its most elevated position. Therefore, they provide remote controls for operating the lever frame 16.

I claim:

1. A stacking and unstacking machine for bales of penetrable material, including the combination of forwardly extending lifting spikes, for penetrating and thus engaging the bale, and a steadying means for retarding swinging of the bale thus lifted, with said lifting spikes carried by and projecting from a lifting mounting and said spikes arranged in a group no wider than bales to be stacked, said steadying means comprising vertically moving spikes carried by said mounting by associating therewith through an operating device also no wider than the bales to be stacked, said lifting mounting comprising a vertical abutment supported by a parallel lever system maintaining it vertical during swinging in a vertical plane, and with said system provided with powering means and working from a truck unit.

2. A machine for stacking and unstacking cotton bales and the like, said machine comprising a powered truck, a vertically swinging parallel lever system mounted at one end by said truck, so said system projects forwardly therefrom, a motor carried by said truck for powering said system to raise and lower its swinging end, a vertical abutment mounted by the swinging end of said lever system and vertically maintained thereby while swinging vertically, laterally spaced spikes projecting forwardly and upwardly from said abutment from near its lower end and so as to penetrate the bale's side near its bottom when pushed thereagainst by operation of said truck, a lever frame pivoted to said abutment near its upper end to swing downwardly to the top of the bale penetrated by said forwardly projecting spikes, laterally spaced spikes projecting downwardly from said lever frame to penetrate the top of the bale and prevent its swinging, spring means biasing said frame to down position, and means for swinging up said lever frame, said spikes projecting from said abutment being mutually spaced laterally no wider than the bale and said lever frame also being no wider so said machine may work into bales stacked in laterally adjacent fashion.

3. A penetrable bale stacking and unstacking machine including a truck, an elevator mounted on said truck and having forwardly projecting spikes positioned so that said truck can run against a bale and force said spikes into the bale, and means on said elevator for holding the bale from falling away therefrom and thus freeing said spikes, the latter being constructed to apply the lifting and lowering motion of said elevator to the bale.

4. A stacking and unstacking machine for bales of penetrable material, said machine including a truck, elevator means mounted on said truck, a substantially vertical lifting and lowering abutment mounted by said means in a position permitting said truck to run said abutment forcibly against a bale, spikes projecting forwardly from said abutment at an upward angle and positioned to penetrate the bale and thus engage the same so that it may be lifted and lowered, and means for holding said bale from moving away from said abutment and becoming disengaged from said spikes while being lifted and lowered.

5. A stacking and unstacking machine for bales of penetrable material, said machine including a truck, elevator means mounted on said truck, a substantially vertical lifting and lowering abutment mounted by said means in a position permitting said truck to run said abutment forcibly against a bale, spikes projecting forwardly from said abutment at an upward angle and positioned to penetrate the bale and thus engage the same so that it may be lifted and lowered, an arm projecting forwardly from said abutment above said spikes and pivotally mounted to swing down on top of the bale, and spikes projecting downwardly from said arm and positioned to penetrate the top of the bale.

MALCOLM A. ROWE.

REFERENCES CITED

The following references are of record in the file of this patent:

UNITED STATES PATENTS

| Number | Name | Date |
| --- | --- | --- |
| 902,410 | Jackson et al. | Oct. 27, 1908 |
| 993,008 | West | May 23, 1911 |
| 1,021,495 | Voellinger | Mar. 26, 1912 |
| 1,086,026 | Chweiback | Feb. 3, 1914 |
| 1,439,227 | Cochran | Dec. 19, 1922 |
| 1,770,640 | Beasley | July 15, 1930 |
| 2,412,570 | Ender | Dec. 17, 1946 |
| 2,420,828 | King | May 20, 1947 |
| 2,463,675 | Beyerstedt | Mar. 8, 1949 |
| 2,471,152 | Griffin | May 24, 1949 |

FOREIGN PATENTS

| Number | Country | Date |
| --- | --- | --- |
| 30,111 | Norway | Oct. 13, 1919 |